United States Patent [19]
Szpur

[11] Patent Number: 5,946,909
[45] Date of Patent: Sep. 7, 1999

[54] FLOATING TURBINE SYSTEM FOR GENERATING POWER

[75] Inventor: Roman Szpur, Kettering, Ohio

[73] Assignee: Swort International, Inc., Dayton, Ohio

[21] Appl. No.: 09/079,911

[22] Filed: May 15, 1998

Related U.S. Application Data

[60] Provisional application No. 60/047,507, May 23, 1997.

[51] Int. Cl.⁶ .................................................. F16D 31/02
[52] U.S. Cl. ................................. 60/398; 415/7; 416/84; 416/85
[58] Field of Search ................................ 60/398; 290/53, 290/54; 415/7; 416/84, 85

[56] References Cited

U.S. PATENT DOCUMENTS

| | | | |
|---|---|---|---|
| 404,488 | 6/1889 | Johnson | 416/85 |
| 530,118 | 12/1894 | Nichols | 60/398 |
| 672,085 | 4/1901 | Tingley | 415/7 |
| 1,025,929 | 5/1912 | Snook | 416/85 |
| 1,830,985 | 11/1931 | Dreier | 416/84 |
| 3,996,741 | 12/1976 | Herberg | 60/398 |
| 4,412,417 | 11/1983 | Dementhon | 60/398 |
| 4,849,647 | 7/1989 | McKenzie . | |
| 4,864,152 | 9/1989 | Pedersen . | |

FOREIGN PATENT DOCUMENTS

| | | | |
|---|---|---|---|
| 329227 | 8/1915 | Germany | 416/85 |
| 159221 | 6/1994 | Japan | 415/7 |

*Primary Examiner*—F. Daniel Lopez
*Attorney, Agent, or Firm*—Jacox, Meckstroth & Jenkins

[57] ABSTRACT

A series of floating turbine rotors each have a tubular hub with outwardly projecting blades, and the rotors are connected in general axial alignment by a flexible driven shaft. The shaft includes tubular floating connector shafts and flexible couplings, and each rotor is connected to drive the shaft through a one-way ratchet clutch. One or more lines of the connected floating rotors are anchored within moving water of a river or in the waves flowing into a seashore, and the rotors drive each flexible shaft which, in turn, drives an electric generator through a fly-wheel and a power converter or drives an air compressor for producing compressed air which is stored in underground tanks and later used to drive an electric generator through an air turbine.

19 Claims, 3 Drawing Sheets

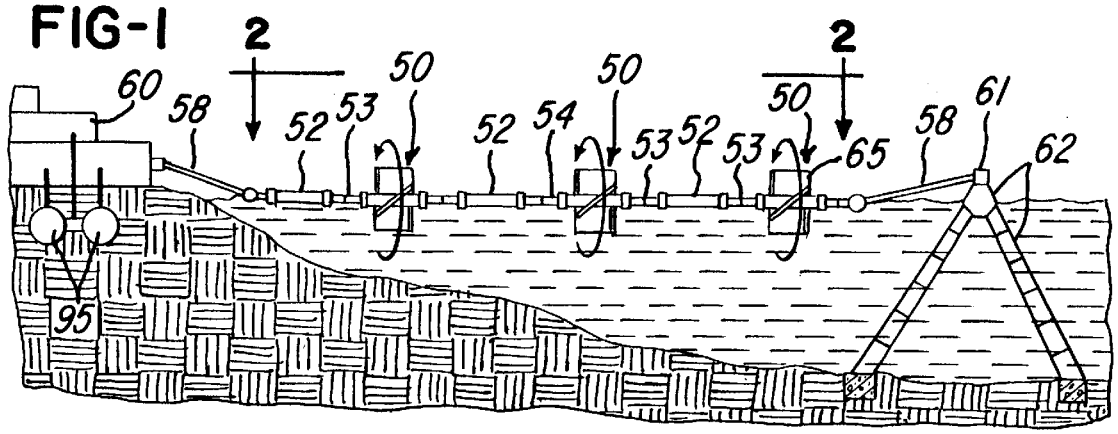
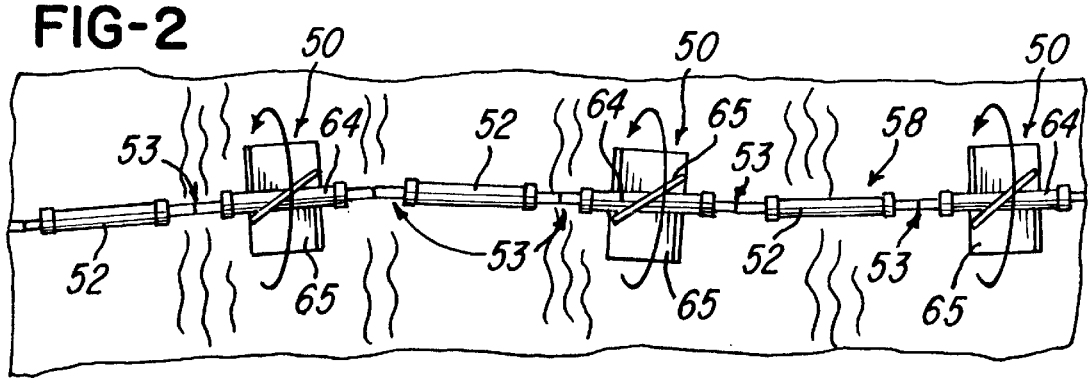
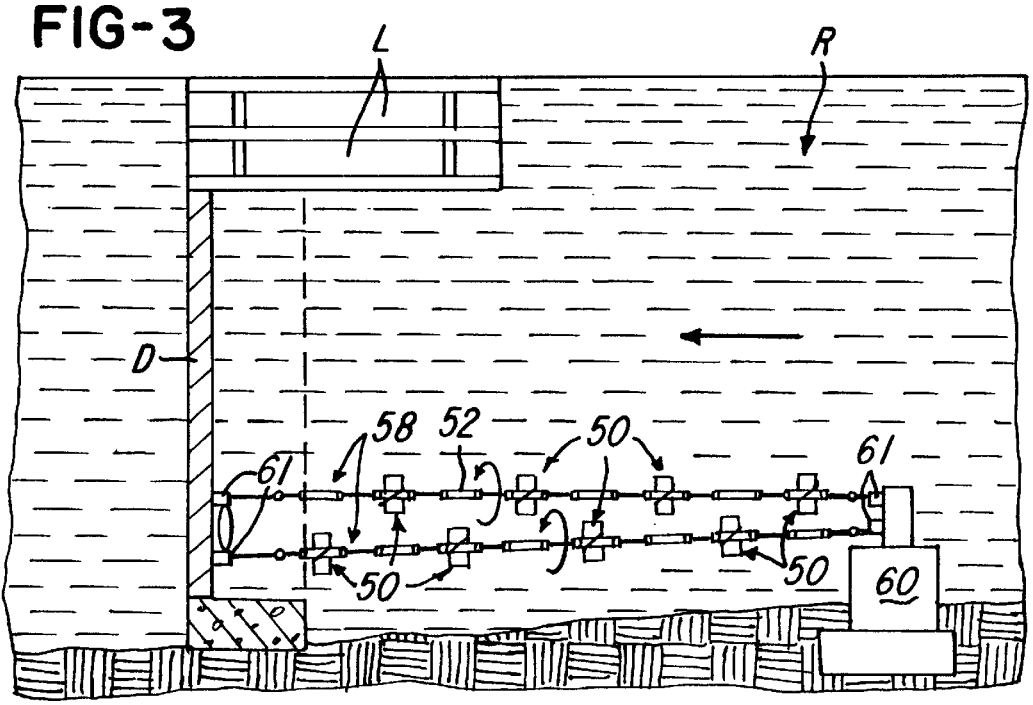

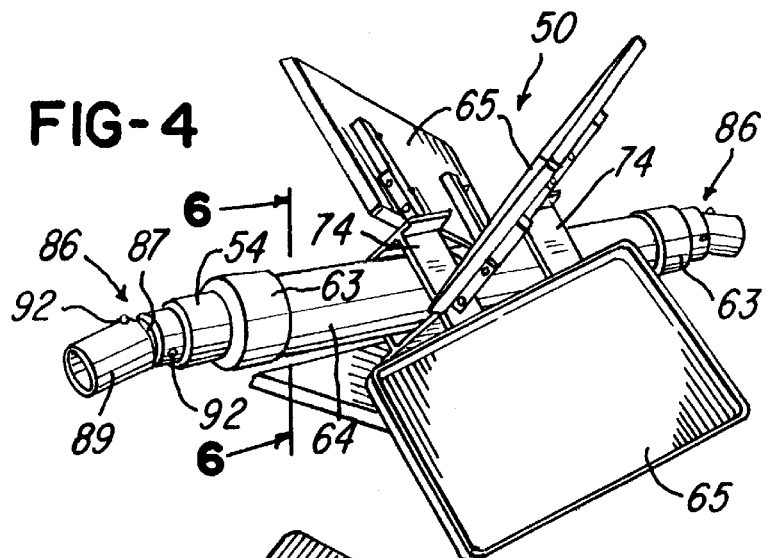
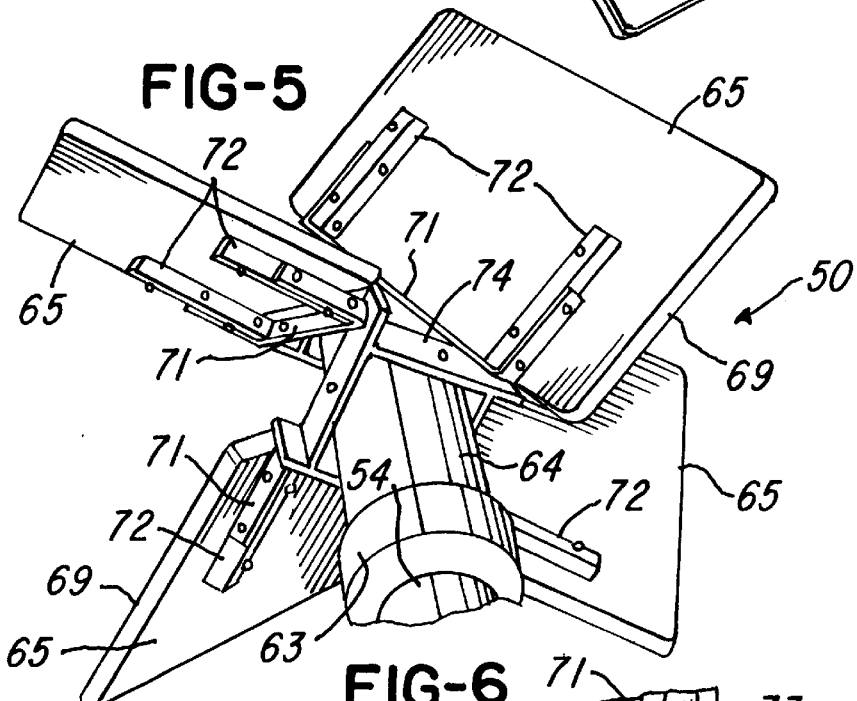
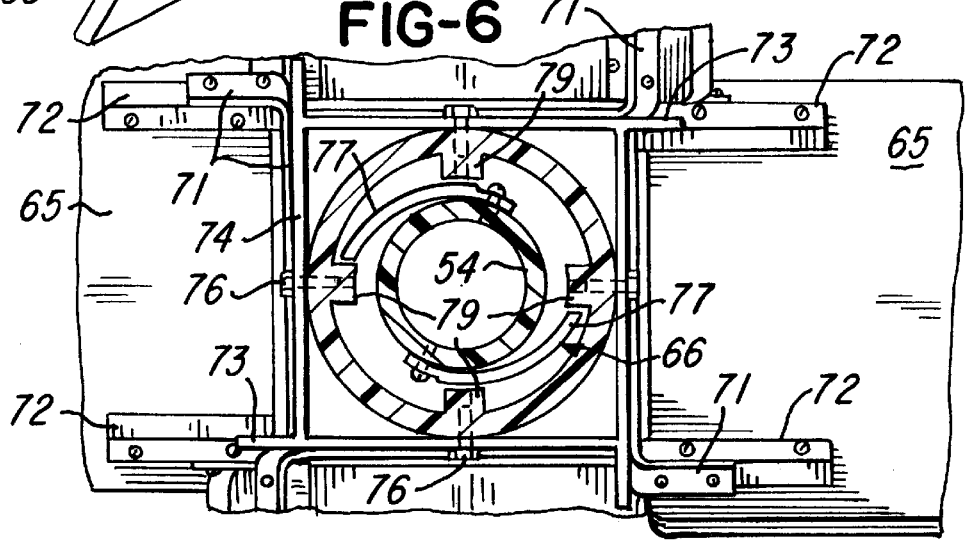

FLOATING TURBINE SYSTEM FOR GENERATING POWER

RELATED APPLICATION

This application claims the benefit of provisional patent application Serial No. 60/047,507, filed May 23, 1997.

BACKGROUND OF THE INVENTION

Waves are a product of the interaction between wind and water. The critical factor in determining wave height is not wind speed, but the distance over which the wind blows. It takes time to build up large waves and the longer the reach of the wind, the higher the waves. Starting from a flat calm sea, there is an orderly progression of events that produce waves that lead from still water to a high rolling swell. Wind blowing across a flat smooth sea hardly catches the water at all. In time, however, it begins to set up a faint pattern of ripples that grip the wind, gradually giving rise to short choppy waves that readily catch the wind. For the first ten hours, those small waves grow rapidly, but after thirty hours, they hardly grow at all.

In the open ocean, waves come in all shapes and sizes, and in different frequencies. Some are little more than ripples that have only just begun to form. Others are left from storms that may have occurred several days before. As the wind continues to drive the waves, however, these confused patterns of waves and ripples slowly begin to sort themselves. Some cancel out as the crest of one wave collides with the trough of another. Others, however, begin to slowly combine as crest meets crest, building up a chain of large waves with nearly identical shapes that move through the ocean with a regular rhythm, known as sea swell.

Once that pattern of a swell is set up, waves can move and gradually grow in height. As those incoming waves slow down, they also begin to change direction. As the waves move closer to shore they continue to grow in height and slow down as the water shallows until they reach some critical point of instability and break. High waves can break and reform several times before they reach shore. Along the beach, each breaking wave sends a turbulent surge of water flowing across the sand. Like a fast-moving stream, that moving water carries grains of sand up and down the face of the beach.

These water movements take place not only on land, but underwater as well. Walking knee-deep through the surf you can feel the pull of the waves against your legs and feel the sand shift under your feet. The beach includes not only the dry sand above water, but the sand underwater as well up to a depth of several meters. Waves and currents are continually carrying sand back and forth between these wet and dry worlds of the beach. While an individual grain of sand can move back and forth several times a day, the net direction of movement changes from season to season as the beach alternately grows and shrinks. In the summer, the net flow of sand is inland. You can see it in the broad, flat surface of the summer beach. The reason for this build up has to do with the average shape and the strength of waves during the summer. It is well known that this moving water or shifting waves have substantial energy which is difficult to harness.

SUMMARY OF THE INVENTION

The forces of the waves of the seas and the oceans are not constant, and the waves are changing continuously. The system of the present invention receives the input of energy from moving water or from the sea waves in a "pulsating" fashion. The output from the system is a rotating force or torque which may also be pulsating. Extensive studies, experiments and tests show that it is possible to collect either continuous energy as in a river or pulsing energy as in sea waves and convert it to a rotating force, then transfer this force onto a rotating shaft which extends to a suitable facility on the land above the high tide of the sea, or to a sea platform, or to a sea vehicle anchored in a special sub-sea area.

A suitable facility constructed in accordance with the invention is capable of converting rotary pulsing energy into compressed air, electric power, or heat via friction systems, and the like. Also, a group of electromagnetic clutches may be used for transferring the rotating energy to all kinds of machines or devices of all sorts. For example, a rotating shaft may drive one or more flywheels in an attempt to maintain constant revolutions per minute.

The system of the invention is totally safe for fish and sea mammals, including large sea mammals such as whales and porpoises. The system is not only a totally non-polluting power supply system for both humans and animals, but also non-polluting for all vegetation, trees, and the like. The system of the invention provides a free power source from Mother Nature. Thus a majority of the coastal areas in the world and many rivers can provide suitable sites for the system, making it a total and complete power source for mankind, both today and in the future.

The cost to build a system constructed in accordance with the invention is small when compared with the cost of building today's electrical power plants. After the initial building and installation costs, only equipment maintenance costs will follow. Thus, the system is relatively low in cost to build and small in size compared to the Novatime era, and non-polluting to man, animals, vegetation, air, and our global natural system. River water flow and sea waves are always there, day and night, winter and summer . . . and dependable! When connected to the national power grid, the system of the invention will help clean our environment of pollutants from nuclear, oil and coal power generating plants.

The present invention is directed to a power generating system which incorporates a series of floating turbine rotors which are connected in series or tandem, preferably by floating connector tubes or shafts and a series of flexible couplings, such as flexible tubes or universal couplings. In a preferred embodiment, each of the rotors is constructed with a floating hub surrounded by peripherally spaced rotor blades. A floating shaft extends through each rotor hub and is connected to the hub by a one way clutch or ratchet. All of the articulated connected shafts cooperate to form a main drive shaft. One end or the upstream end of the main drive shaft or line is supported by a thrust bearing connected to an anchor at the water or sea level. The anchor may be secured to the earth underneath the water and is spaced outwardly from the shore line. The thrust bearing and the anchor may also be associated with a power conversion facility having a portion projecting outwardly from the shore of a river or on an off-shore platform.

The opposite or downstream end of the main drive shaft or line may be connected to a power conversion facility or another anchor which maintains the generally aligned relation of the floating turbine rotors. The rotary power from the flexible main or line shaft may be used to drive a large flywheel to produce a substantially constant R.P.M. which may then be used to drive an electrical generator. The rotary power from the flexible line shaft and series connected turbine rotors may also be used to drive an air compressor which supplies air to an underground compressed air storage tank or tanks. The compressed air is then used to drive an air turbine which, in turn, drives an electrical generator.

Other features and advantages of the invention will be apparent from the following description, the accompanying drawings and the appended claims.

BRIEF DESCRIPTION OF THE DRAWINGS

FIG. 1 is a diagrammatic elevational view of a floating turbine system constructed in accordance with the invention for generating power;

FIG. 2 is a diagrammatic plan view of the system and taken generally on the line 2—2 of FIG. 1;

FIG. 3 is a diagrammatic plan view illustrating the use of two lines of floating turbine systems on a river for generating power;

FIG. 4 is a perspective view of a prototype floating turbine rotor and connecting universal coupling, as constructed in accordance with the invention;

FIG. 5 is a fragmentary perspective view of the rotor shown in FIG. 4;

FIG. 6 is a radial section of the rotor taken generally on the line 6—6 of FIG. 4;

DESCRIPTION OF THE PREFERRED EMBODIMENTS

Figure 7:
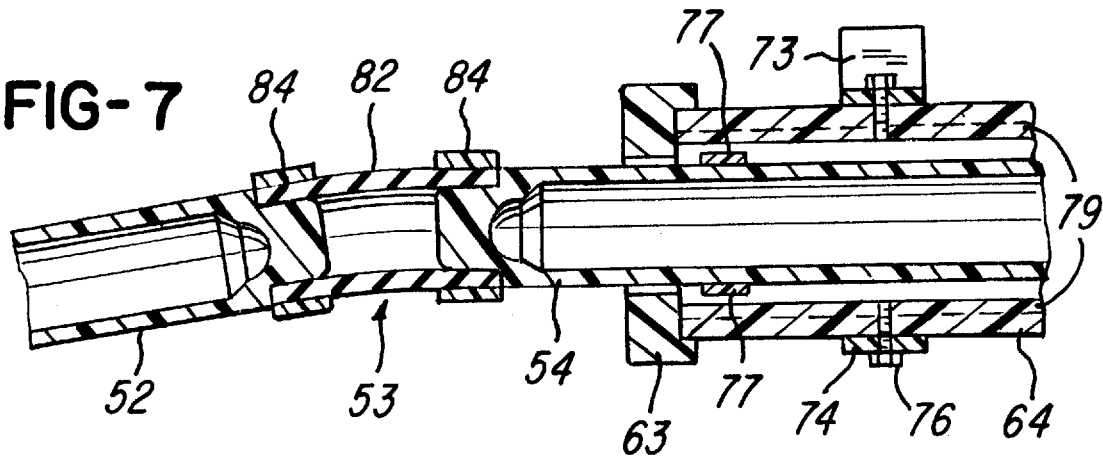
FIG. 7 is a fragmentary axial section of a flexible coupling and rotor shaft constructed in accordance with the invention.

FIGS. 1 & 2 illustrate the installation of a single line floating turbine system constructed in accordance with the invention and which includes a plurality of three floating turbine rotors 50 connected in tandem or series by floating connector shafts 52 and flexible couplings 53. The shafts 52 are connected by the couplings 53 to floating shafts 54 (FIG. 6) within the turbine rotors 50 to form a main flexible or articulated drive shaft 58 which extends on one end to a power transmission plant or facility 60 and on the opposite end to a thrust bearing 61 supported by a sea water anchor 62. The facility 60 converts the rotary power from the shaft 58 into electrical power through an electric generator or into power which may be stored such as compressed air and used later for driving an air turbine connected to a generator.

There may also be multiple line turbine systems wherein each line has a main drive shaft 58 extending between the power generating facility 60 and corresponding anchors 62. The main drive shafts 58 for multiple lines of turbine rotors 50 may extend from a power conversion facility which is anchored at sea and includes equipment for converting the rotary energy or power from the shafts 58 into compressed air which is directed through a flexible tube or line to the power generating plant or facility 60 located on land.

FIG. 3 illustrates multiple lines of floating turbine rotors 50 with corresponding flexible main drive shafts 58 extending downstream of a river R from a power generating facility 60 to corresponding anchors 62 secured to a spillway or dam D adjacent a set of boat locks L. Opposite ends of the drive shafts 58 are supported by corresponding thrust bearings 61 which carry the axial forces or loads on the shafts 58 as produced by the series of turbine rotors 50 on each shaft 58.

The preferred basic construction of each floating turbine rotor 50 is shown in FIGS. 4–6. That is, the center shaft 54 of each turbine rotor 50 is driven in only one direction by a cylindrical floating hub 64 having annular end caps 63 and supporting outwardly projecting blades 65. If the wave movement of the water in which a turbine rotor 50 floats is such that the rotor hub 64 is not being rotated by the water or is blocked from rotation, a one-way clutch or ratchet system 66 within each turbine hub 64 permits the corresponding shaft 54 to continue rotating as a result of its connection to other turbine shafts 54 through the floating connector shafts 52 and flexible couplings 53.

Each of the blades 65 has a peripheral flange 69 projecting at an acute angle from the flat wall of the blade, and the blade 65 is supported by a U-shaped metal bracket 71 having legs secured by screws to bars 72 attached by screws to the blade. Each bracket 71 is mounted on projecting flanges 73 of two axially spaced box-shaped adaptors 74 secured to the hub 64 by screws 76. The ratchet system 66 between each hollow shaft 54 and the corresponding hub 64 includes a set of spring cam fingers 77 having inner ends secured to the shaft 54 and outer ends normally engaging longitudinally extending ribs 79 extruded or formed as integral parts of the hub 64. In the event a rotor 50 was stopped for some reason, for example, by a floating log or a returning segment of water, the shaft 53 could continue to be driven by other rotors 50 while the spring fingers 77 slip over the ribs 79.

The floating turbine rotors 50 may have substantial diameter, for example, from ten to twenty feet. Also the blades may have different configurations other than that shown in FIG. 4. For example, each blade 65 may have a tapered or rounded leading edge and may be slightly bent or curved in order to optimize the performance of the turbine rotor and to prevent sea weed or other floating matter within the water from collecting on the leading edges of the blades.

As mentioned above, large flywheels (not shown) may be connected to each main drive shaft 58 for driving an electric generator through a speed enhancer gearbox or other power conversion equipment which require a generally constant R.P.M. Also, crank-shape pivot arms may be used to transfer power from a shaft 58 to a facility 60 and also permit each line of rotors 50 to float on the sea water in order to capture the energy of the flowing waves and to accommodate changes in the level of the sea water due to tide changes.

As shown in FIG. 7, each of the flexible couplings 53 may be a flexible rubber-like floating tube 82 having end portions secured to the shafts 52 and 53 by band clamps 84. A flexible coupling 53 may also be formed as a universal joint 86 (FIG. 4) which includes a smaller connecting tube 87 spaced within the shaft 54 and a larger tube or fitting 88 and secured to the shaft 52 and 54 by a set of cross bolts 92 arranged at right angles to each other.

Figure 8:
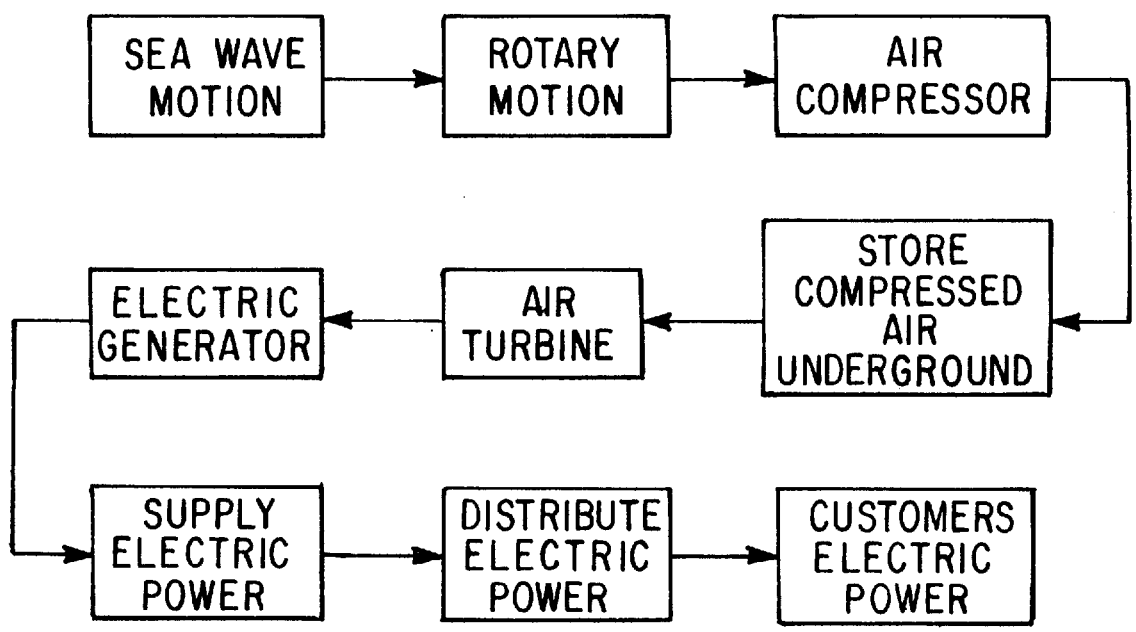
FIG. 8 is a blocked diagram illustrating one form of converting sea wave motion to electrical power in accordance with the invention for distribution to customers.

The diagram of FIG. 8 illustrates how the rotary motion of the main drive shaft 58 of each power producing line may be used to compress air which may be stored in underground tanks 95 (FIG. 1) and later used to drive an air turbine connected to an electric generator. Such a system may be used in lieu of directly driving a flywheel which is simultaneously used to drive an electric generator through a stepped up speed converter.

While the forms of apparatus herein described constitute preferred embodiments of the invention, it is to be understood that the invention is not limited to these precise forms of apparatus, and that changes may be made therein without departing from the scope and spirit of the invention as defined in the appended claims.

What is claimed is:

1. Apparatus for converting moving water into rotary power, comprising at least one turbine rotor including a hub member having means for floating said hub member adjacent the surface of the water, a plurality of peripherally spaced blades projecting outwardly from said hub member, a rigid blade support frame mounted on said hub member and including blade support members projecting outwardly from said hub member adjacent said blades, means for securing said blades to said blade support members, and a driven shaft connected to said hub member.

2. Apparatus as defined in claim 1 and including a plurality of said turbine rotors connected in general axial alignment by said driven shaft.

3. Apparatus as defined in claim 2 and including a plurality of floating tubular connector shafts forming part of said driven shaft.

4. Apparatus as defined in claim 1 and including a one-way clutch connecting said rotor hub member to said driven shaft and providing for rotation of said driven shaft in only one direction in response to rotation of said rotor.

5. Apparatus as defined in claim 1, wherein said driven shaft comprises a floating tubular shaft member.

6. Apparatus as defined in claim 1 wherein said hub member is generally cylindrical and hollow.

7. Apparatus as defined in claim 1 wherein each said blade is generally flat and includes an angularly projecting outer flange portion.

8. Apparatus as defined in claim 1 wherein said blade support frame includes two blade support members spaced axially relative to a center axis of said rotor and providing for positioning each said blade at a selected predetermined pitch angle relative to said axis.

9. Apparatus as defined in claim 1 and including a thrust bearing connected to said driven shaft, and an anchor connected to said thrust bearing.

10. Apparatus as defined in claim 9 wherein said driven shaft extends generally between said anchor and a seashore.

11. Apparatus as defined in claim 1 wherein said driven shaft extends generally parallel to the shore line of a river.

12. Apparatus as defined in claim 1 and including an air compressor driven by said driven shaft, and underground tank means for storing compressed air received from said compressor for driving an air turbine connected to an electrical generator.

13. Apparatus for converting a moving flow of water into rotary power comprising a plurality of floating turbine rotors each including a hub member supporting a plurality of peripherally spaced blades, means associated with each of said rotors for floating said rotors adjacent the water surface and with a portion of said blades projecting upwardly into the air, a flexible driven shaft including a plurality of floating tubular connector shafts and flexible couplings connecting said rotors in general axial alignment, and a one-way clutch connecting said hub member of each said rotor to said driven shaft and providing for rotation of said driven shaft in only one direction in response to rotation of said rotor.

14. Apparatus as defined in claim 13 wherein said driven shaft includes a tubular shaft extending through each of said rotors.

15. Apparatus as defined in claim 13 wherein said driven shaft extends generally parallel to a shore line of a river.

16. Apparatus as defined in claim 13 wherein said one-way clutch comprises a ratchet system including movable cam fingers.

17. Apparatus as defined in claim 13 wherein each of said flexible couplings comprises a universal joint.

18. Apparatus as defined in claim 1 and including a thrust bearing connected to said driven shaft, and an anchor connected to said thrust bearing.

19. Apparatus as defined in claim 18 wherein said driven shaft extends generally between said anchor and a seashore.

* * * * *